United States Patent
Braig et al.

(10) Patent No.: US 8,076,436 B2
(45) Date of Patent: Dec. 13, 2011

(54) METHOD FOR THE PRODUCTION OF SUPERABSORBERS

(75) Inventors: Volker Braig, Weinheim-Lützelsachsen (DE); Michael de Marco, Palo Alto, CA (US); Michael Stösser, Neuhofen (DE); Joachim Pakusch, Speyer (DE)

(73) Assignee: BASF SE, Ludwigshafen (DE)

( * ) Notice: Subject to any disclaimer, the term of this patent is extended or adjusted under 35 U.S.C. 154(b) by 297 days.

(21) Appl. No.: 12/443,559

(22) PCT Filed: Oct. 17, 2007

(86) PCT No.: PCT/EP2007/061056
§ 371 (c)(1), (2), (4) Date: Mar. 30, 2009

(87) PCT Pub. No.: WO2008/046841
PCT Pub. Date: Apr. 24, 2008

(65) Prior Publication Data
US 2010/0004418 A1    Jan. 7, 2010

(30) Foreign Application Priority Data
Oct. 19, 2006  (EP) ................................ 06122580

(51) Int. Cl.
C08F 16/26    (2006.01)
C08F 20/06    (2006.01)
(52) U.S. Cl. ...................... 526/333; 526/332; 526/317.1
(58) Field of Classification Search .................. 526/332, 526/333
See application file for complete search history.

(56) References Cited

U.S. PATENT DOCUMENTS

| | | | |
|---|---|---|---|
| 4,873,299 A | 10/1989 | Nowakowsky et al. |
| 5,073,612 A | 12/1991 | Irie et al. |
| 5,837,789 A | 11/1998 | Stockhausen et al. |
| 6,143,821 A | 11/2000 | Houben et al. |
| 6,350,710 B1 | 2/2002 | Jonas et al. |
| 6,395,830 B1 | 5/2002 | Jonas et al. |
| 6,623,848 B2 | 9/2003 | Brehm et al. |
| 6,710,141 B1 | 3/2004 | Heide et al. |
| 6,831,142 B2 | 12/2004 | Mertens et al. |
| 6,911,499 B1 | 6/2005 | Brehm et al. |
| 7,393,908 B2 | 7/2008 | Heide et al. |
| 2004/0186229 A1 | 9/2004 | Heide et al. |
| 2005/0074614 A1 | 4/2005 | Jonas et al. |
| 2006/0167215 A1 | 7/2006 | Hermeling et al. |
| 2008/0004408 A1 | 1/2008 | Stueven et al. |
| 2008/0080300 A1 | 4/2008 | Stueven et al. |
| 2009/0008220 A1 | 1/2009 | Hillebrecht et al. |

FOREIGN PATENT DOCUMENTS

| | | |
|---|---|---|
| CA | 2426802 A1 | 4/2003 |
| DE | 19543368 A1 | 5/1997 |
| DE | 19646484 A1 | 5/1997 |
| DE | 19645240 A1 | 1/1998 |
| DE | 19939662 A1 | 2/2001 |
| DE | 19941423 A1 | 3/2001 |
| EP | 238050 A2 | 9/1987 |
| EP | 0629411 A1 | 12/1994 |
| JP | 62104805 A | 5/1987 |
| JP | 11228685 A | 8/1999 |
| JP | 2000001541 A | 1/2000 |
| WO | WO-90/15830 A1 | 12/1990 |
| WO | WO-93/21237 A1 | 10/1993 |
| WO | WO-98/47951 A1 | 10/1998 |
| WO | WO-99/10407 A1 | 3/1999 |
| WO | WO-01/00258 A1 | 1/2001 |
| WO | WO-01/00259 A1 | 1/2001 |

(Continued)

OTHER PUBLICATIONS

International Search Report and Written Opinion in PCT/EP2007/061056 dated Dec. 12, 2007.

*Primary Examiner* — David W Wu
*Assistant Examiner* — Vu A Nguyen
(74) *Attorney, Agent, or Firm* — Marshall, Gerstein & Borun LLP

(57) ABSTRACT

Superabsorbents are produced by polymerization in the presence of at least one unsaturated polyetherol selected from the group consisting of polyetherols having the following structural formulae (1), (2), (3) and (4):

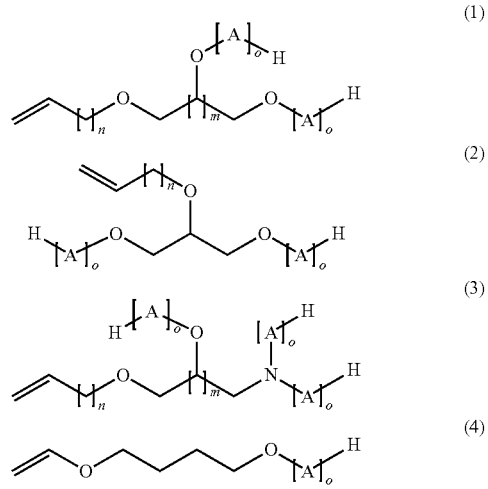

where n is 0 or 1,
m is 1, 2, 3, 4, 5 or 6,
o is a natural number from 1 to 200, and
A is $-(H_2C-CHR^1-O)-$ or $-(R^1HC-CH_2-O)-$, where $R^1$ in each occurrence is independently hydrogen or an organic radical.

11 Claims, No Drawings

FOREIGN PATENT DOCUMENTS

| | | |
|---|---|---|
| WO | WO-01/38402 A1 | 5/2001 |
| WO | WO-01/41818 A2 | 6/2001 |
| WO | WO-01/45758 A1 | 6/2001 |
| WO | WO-01/56625 A2 | 8/2001 |
| WO | WO-02/20068 A1 | 3/2002 |
| WO | WO-02/32964 A2 | 4/2002 |
| WO | WO-02/34384 A2 | 5/2002 |
| WO | WO-2005/005513 A1 | 1/2005 |
| WO | WO-2006/034806 A1 | 4/2006 |
| WO | WO-2006/034853 A1 | 4/2006 |
| WO | WO-2007/003619 A1 | 1/2007 |

METHOD FOR THE PRODUCTION OF SUPERABSORBERS

CROSS-REFERENCE TO RELATED APPLICATIONS

This is the U.S. national phase of International Application No. PCT/EP2007/061056, filed Oct. 17, 2007, which claims the benefit of European Patent Application No. 06122580.1, filed Oct. 19, 2006.

The present invention relates to a process for producing superabsorbents. More particularly, the present invention relates to an improved process for producing superabsorbents in kneading reactors. The present invention further relates to the superabsorbents obtained using the process of the present invention and also to articles for absorbing fluid which comprise this superabsorbent.

Superabsorbents are known. Such materials are also commonly known by designations such as "high-swellability polymer", "hydrogel" (often even used for the dry form), "hydrogel-forming polymer", "water-absorbing polymer", "absorbent gel-forming material", "swellable resin", "water-absorbing resin" or the like, as well as by the abbreviation SAP for "super absorbent polymer". The materials in question are crosslinked hydrophilic polymers, in particular polymers formed from (co)polymerized hydrophilic monomers, graft (co)polymers of one or more hydrophilic monomers on a suitable grafting base, crosslinked ethers of cellulose or starch, crosslinked carboxymethylcellulose, partially crosslinked polyalkylene oxide or natural products that are swellable in aqueous fluids, examples being guar derivatives, of which water-absorbing polymers based on partially neutralized acrylic acid are most widely used. The essential properties of superabsorbents are their ability to absorb and retain amounts of aqueous fluids equivalent to many times their own weight, even under moderate pressure. A superabsorbent which is used in the form of a dry powder transforms into a gel on taking up a liquid, specifically into a hydrogel when as usual taking up water. By far the most important field of use of superabsorbents is the absorbing of bodily fluids. Superabsorbents are used for example in diapers for infants, incontinence products for adults or feminine hygiene products. Examples of other fields of use are as water-retaining agents in market gardening, as water stores for protection against fire, for liquid absorption in food packaging or, in general, for absorbing moisture.

Not just its absorption capacity is important for a superabsorbent, but also the ability to retain liquid under pressure and also to transport liquid in the swollen state. Swollen gel can impair or even block ("gel blocking") the transporation of liquid to as yet unswollen superabsorbent. Good transporation properties for liquids are possessed for example by hydrogels having high gel strength in the swollen state. Gels lacking in strength are deformable under an applied pressure, for example pressure due to body weight, and clog the pores in the SAP/cellulose fiber absorbent and so prevent continued absorption of fluid. Enhanced gel strength is generally obtained through a higher degree of crosslinking, although this reduces the product's retention performance. An elegant way to enhance gel strength is surface postcrosslinking. In this process, dried superabsorbents having an average crosslink density are subject to an additional crosslinking step. Surface postcrosslinking increases the crosslink density in the surface shell of the superabsorbent particle, raising its absorbency under load to a higher level. Whereas the absorption capacity decreases in the superabsorbent particle shell, the core has an improved absorption capacity (compared to the shell) owing to the presence of mobile chains of polymer, so that shell construction ensures improved fluid transmission without occurrence of the gel-blocking effect. It is perfectly desirable for there to be a time delay in the exhaustion of the total capacity of the superabsorbent as compared with spontaneous exhaustion. Since the hygiene article is generally repeatedly insulted with urine, the absorption capacity of the superabsorbent should sensibly not be exhausted after the first insult or disposition.

The superabsorbents in question here are customary superabsorbents, capable of absorbing and retaining under pressure a multiple of their own weight of water. In general, such a superabsorbent will have a Centrifuge Retention Capacity (CRC, method of measurement given hereinbelow) of at least 5 g/g, preferably at least 10 g/g and more preferably at least 15 g/g. A superabsorbent can also be a mixture of chemically different superabsorbents or of components which do not have superabsorbent properties until they cooperate, so it is less its chemical composition which makes a superabsorbent but the fact that it has superabsorbent (superabsorbing) properties.

Processes for producing superabsorbents are also known. Superabsorbents based on acrylic acid, which are the most common form of superabsorbent in the market, are produced by free-radical polymerization of acrylic acid in the presence of a crosslinker (the "internal crosslinker"), with the acrylic acid being partially neutralized, typically by addition of alkali, usually of an aqueous sodium hydroxide solution, before, after or partly before, partly after the polymerization. The polymer gel thus obtained is comminuted (which, depending on the polymerization reactor used, can take place concurrently with the polymerization) and dried. The dry powder thus obtained, which is known as the base polymer, is typically postcrosslinked at the surface of the particles by reacting it with further crosslinkers such as, for example, organic crosslinkers or multivalent cations, for example aluminum (usually used in the form of aluminum sulfate) to produce a more highly crosslinked surface layer compared with the particle interior.

Frederic L. Buchholz and Andrew T. Graham (editors): "Modern Superabsorbent Polymer Technology", J. Wiley & Sons, New York, U.S.A./Wiley-VCH, Weinheim, Germany, 1997, ISBN 0-471-19411-5, provide a comprehensive overview of existing processes for producing superabsorbents.

WO 2005005 513 A1 discloses (meth)acrylic esters of alkoxylated unsaturated polyol ethers and their production. These esters have the general formula I

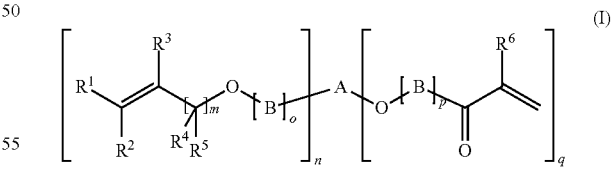

where
$R^1$, $R^2$, $R^3$, $R^4$ and $R^5$ are independently hydrogen or $C_1$- to $C_6$-alkyl, of which $C_3$- to $C_6$-alkyl may be branched or unbranched,
$R^6$ is hydrogen or methyl,
m is an integer from 0 to 10,
n is an integer from 1 to 5,
o is an integer from 0 to 100,
p is an integer from 2 to 100,
q is an integer from 1 to 5, and A is $C_3$- to $C_{20}$-alk(n+q)yl or $C_3$- to $C_{20}$-heteroalk(n+q)yl,
the sum total of n and q is an integer from 3 to 10, and
B represents identical or different radicals selected from the group of radicals having the following structural formulae:

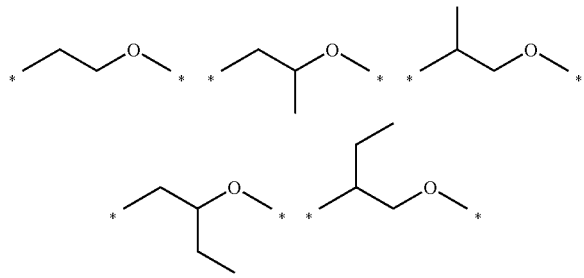

where * indicates the positions of attachment.

These esters are obtainable by esterification of alkoxylated and unsaturated polyol ether alcohols of the general formula II

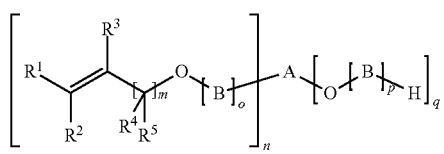

where $R^1$, $R^2$, $R^3$, $R^4$, $R^5$, m, n, o, p, q, A and B are each as defined above, with (meth)acrylic acid.

WO 90/15 830 A1 discloses a superabsorbent obtained using a crosslinker mixture comprising a bis- or trisacryloyl-containing compound such as polyethylene glycol diacrylate having one to 9 ethylene glycol units per molecule as one component. The other is selected from bisallyl ethers, bisallylamides, bisallylamines and triallylamine and is for example a diallyl ether of a polyol such as polyethylene glycol having one to three ethylene glycol units in the molecule. WO 02/32 964 A2 recommends the use of a crosslinker mixture where one component preferably is an allyl ether of a polyhydric alcohol such as the diallyl ether of a polyethylene glycol having a molecular weight of 200 to 2000, i.e., having about 4 to 44 glycol units in the molecule.

Similarly DE 195 43 368 A1, DE 196 45 240 A1, DE 199 39 662 A1, DE 199 41 423 A1, WO 01/00 258 A1, WO 01/00 259 A1, WO 02/20 068 A1 and WO 02/34 384 A2 describe the use of (meth)acrylic esters of alkoxylated allyl alcohol as a crosslinker for superabsorbents.

EP 238 050 A2 discloses trimethylolpropane triacrylate, at least doubly acrylated or methacrylated glycerol and doubly or triply acrylated or methacrylated addition products of ethylene oxide and/or propylene oxide onto trimethylolpropane as possible internal crosslinkers for superabsorbents. The latter crosslinkers are also described in WO 93/21 237 A1. These and similar crosslinkers are also used according to the teachings of WO 98/47 951 A1, WO 01/41 818 A1 and WO 01/56 625 A2.

According all the prior art references cited, the (meth) acrylic esters are each obtainable by esterification of the corresponding alcohols, which are also disclosed in the respective reference or are general common knowledge.

DE 196 46 484 A1 describes inter alia the monoallyl ether of ethylene glycol or of polyethylene glycol having up to 45 ethylene glycol units in the molecule and also its (meth) acrylic ester, which are used as constituents of a crosslinker mixture for superabsorbent production. Similarly, Japanese OPI document JP 62/104 805 describes monoallyl ethers of polyethylene glycol or of a mixed polyethylene/propylene glycol, which are utilized therein as a comonomer in superabsorbent production. Crosslinkers used in this case are haloepoxyalkanes, polyepoxides or aldehydes.

Japanese OPI documents JP 2000/001 541 and JP 11/228 685 disclose the production of a glyceryl monoallyl ether where the other two hydroxyl groups of the glycerol are polyalkoxylated with ethylene glycol or ethylene glycol/propylene glycol units. WO 99/10 407 A1 describes the production of such polyether polyols having unsaturated groups using double metal cyanide catalysts.

U.S. Pat. No. 5,073,612 teaches a process for producing superabsorbents which utilizes an alpha,beta-unsaturated comonomer that further comprises hydroxyl groups. The process of WO 01/45 758 A1, by contrast, utilizes a crosslinker mixture where one component still comprises a free hydroxyl group. Similarly, EP 629 411 A1 utilizes a crosslinker mixture comprising free hydroxyl groups.

WO 2006/034806 A1, WO 2006/034 853 A1, WO 01/38402 A1 and also prior international application PCT/EP/2006/063 787 teach processes for continuous production of superabsorbents in kneaders.

It is an object of the present invention to provide novel or improved processes for producing superabsorbents. Desired are in particular processes which avoid the formation of by-products or waste or reject material and also reduce or obviate the need for recycling or other cost/inconvenience to recover product that is not directly marketable. Desired is in particular a process wherein the formation of uncomminuted clumps of product, observed particularly in embodiments involving concurrent polymerization and comminution (in kneading reactors for example) is reduced or avoided, obviating any need for their removal and recycling or other treatment (a separate comminution for example). This recycling or other treatment is a major inconvenience in that these clumps of swollen sticky polymeric gel are very difficult to convey or comminute.

We have found that this object is achieved by a process for producing superabsorbents, which comprises polymerizing in the presence of at least one unsaturated polyetherol selected from the group consisting of polyetherols having the following structural formulae (1), (2), (3) and (4):

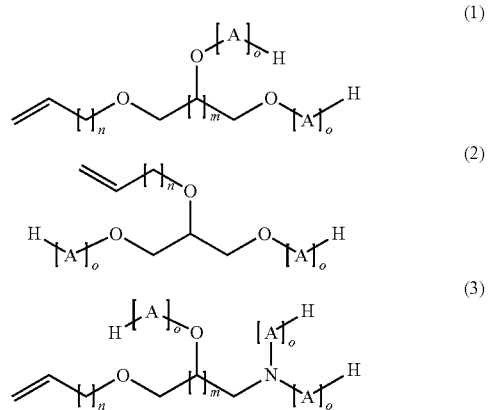

(4)

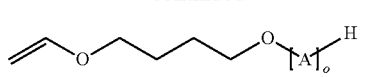

where n is 0 or 1,
m is 1, 2, 3, 4, 5 or 6,
o is a natural number from 1 to 200, and
A is —($H_2C$—$CHR^1$—O)— or —($R^1HC$—$CH_2$—O)—, where $R^1$ in each occurrence is independently hydrogen or an organic radical.

The process of the present invention, particularly when conducted in a reactor featuring concurrent polymerization and comminution, was found to generate fewer clumps than existing processes. Removal and recycling or other treatment of clumps is avoided or at least appreciably reduced. As a result, the process of the present invention is more economical than prior art processes. The present invention further provides the superabsorbents obtainable using the process of the present invention and also hygiene articles comprising these superabsorbents.

The compounds to be added are polyetherols, i.e., compounds having ether groups and alcohol groups. They are unsaturated, i.e., they additionally comprise at least one ethylenically unsaturated group, i.e., a C=C double bond.

In the above formulae, n is 0 or 1. When n is 0, the compounds in question are vinyl ethers, when n is 1 they are allyl ethers.

Preference is given to using unsaturated polyetherols of the above formulae where m is 1.

Preference is given to adding unsaturated polyetherols of the above formulae where o is a natural number from 1 to 100, more preferably those where o is a natural number from 1 to 50. Very particular preference is given to using these polyetherols when o is a natural number from 10 to 30. The number o is the number of alkylene oxide units in the polyetherol chain. The alkoxylation of alcohols with alkylene oxides always gives rise to mixtures comprising chains of alkylene oxide units that differ in length. The number o is therefore not necessarily identical for two molecules of any one compound of the above formulae. When the compound in question has more than one chain of alkylene oxide units, the number o of one of the chains within any one individual molecule is not even necessarily identical to the number o of any other chain of the same molecule. The number o therefore represents the statistical average number of alkylene oxide units in a chain of alkylene oxide units in the compound in question, i.e., the average degree of alkoxylation.

In the above formulae, A represents an alkylene oxide unit in a polyether chain as formed on reacting alcohols or amines with alkylene oxides (oxiranes). The $R^1$ substituent is a substituent on the oxirane ring of the alkylene oxide used for alkoxylation, typically an organic radical. Preference is given to using unsaturated polyetherols of the above formulae where A is —($H_2C$—$CHR^1$—O)— or —($R^1HC$—$CH_2$—O)—, where $R^1$ is hydrogen, linear alkyl or phenyl. More preferably, $R^1$ is hydrogen, methyl or ethyl. The $R^1$ radicals can also be different in any one compound to be used according to the invention, even within a molecule. In other words, useful polyetherols include polyetherols alkoxylated with different alkylene oxides. When this is the case, the alkylene oxide units may be block- or randomly distributed in the chain.

The unsaturated polyetherols to be added according to the present invention are known as are methods for making them. Such compounds are also common commercial products. They are usually made by first preparing a vinyl or allyl ether of a polyol, which is alkoxylated with alkylene oxide. In the case of compounds of the formula (3), a vinyl or allyl ether of an amino alcohol or of an aminated polyol is used, correspondingly. For simplicity, such amino alcohols or aminated polyols shall hereinbelow be subsumed under "polyol".

Such vinyl ethers are obtained for example by reaction of an appropriate polyol with acetylene. An example of a particularly convenient way to synthesize the core structure of compounds of the formula (4) is the monovinylation of butanediol with acetylene.

Allyl ethers of polyols are obtainable by etherification of allyl alcohol (2-propen-1-ol) with the appropriate polyols in appropriate stoichiometry, by reaction of allyl chloride with the appropriate polyol or by reaction of allyl alcohol with an appropriate polyol chloride. An example of a particularly convenient way to synthesize core structures of compounds of the formulae (1), (2) and (3) where n=1 and m=1 is to react allyl alcohol with epichlorohydrin (1-chloro-2-epoxypropane) to form 1-allyloxy-2-epoxypropane and then to hydrolyze or aminolyze the oxirane ring.

Examples of unsaturated polyol allyl ethers which can be alkoxylated to form polyol ethers useful for the purposes of the present invention are 1-glyceryl monoallyl ether, 2-glyceryl monoallyl ether, 1-glyceryl monovinyl ether, 2-glyceryl monovinyl ether. 1-Glyceryl monoallyl ether is a preferred example.

The vinyl or allyl ethers thus produced are subsequently alkoxylated by reaction with alkylene oxide. Useful alkylene oxides include for example ethylene oxide (oxirane), propylene oxide (1,2-epoxypropene, methyloxirane) and/or butylene oxide (1,2-epoxybutene, ethyloxirane) or styrene oxide (2-phenyl-1,2-epoxyethene, phenyloxirane). Preference is given to using ethylene oxide or propylene oxide. These processes are known as well. Possible ways to carry them out are to be found inter alia in Houben-Weyl, Methoden der Organischen Chemie, 4th edition, 1963, Thieme Verlag Stuttgart, volume 14/2, pages 440 to 444.

The viscosity of the alkoxylated unsaturated polyetherols to be used according to the present invention does not have to meet particular requirements, except that they should be readily pumpable at down to about 80° C. Preferably, their viscosity should be below 2000 mPas, more preferably below 1000 mPas and most preferably below 500 mPas.

Processes for producing superabsorbents, including surface-postcrosslinked superabsorbents, are known. Synthetic superabsorbents are obtained for example by polymerization of a monomer solution comprising a) at least one ethylenically unsaturated, acid-functional monomer, b) at least one crosslinker, c) selectively one or more ethylenically and/or allylically unsaturated monomers copolymerizable with the monomer a), and d) selectively one or more water-soluble polymers onto which the monomers a), b) and if appropriate c) can be at least partly grafted.

In accordance with the present invention, this monomer solution as described above is admixed with e) at least one unsaturated polyetherol selected from the group consisting of polyetherols having the following structural formulae (1), (2), (3) and (4):

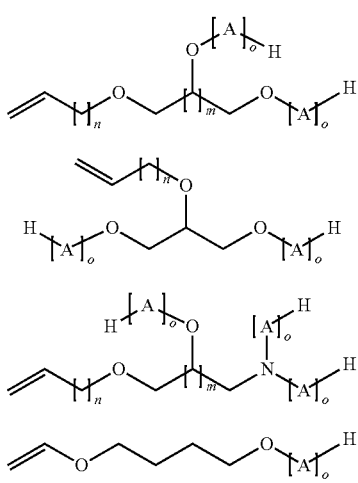

where n is 0 or 1,
m is 1, 2, 3, 4, 5 or 6,
o is a natural number from 1 to 200, and
A is —(H$_2$C—CHR$^1$—O)— or —(R$^1$HC—CH$_2$—O)—, where R$^1$ in each occurrence is independently hydrogen or an organic radical.

The polyetherol or polyetherol mixture is added before or during the polymerization or partly before or after the polymerization. It is similarly possible to add a polyetherol or polyetherol mixture before the polymerization and another polyetherol or polyetherol mixture during the polymerization. It is particularly convenient and therefore preferable to add to the monomer solution before the polymerization.

The total amount of polyetherol e) added is generally at least 0.001% by weight, preferably at least 0.01% by weight and more preferably at least 0.03% by weight and also generally at most 1% by weight, preferably at most 0.5% by weight and more preferably at most 0.03% by weight, all based on the monomer a) in the monomer solution.

Suitable monomers a) are for example ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Acrylic acid and methacrylic acid are particularly preferred monomers. (The term "(meth) acrylic" is often used for both methacrylic and acrylic.) Acrylic acid is very particularly preferred.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula (III):

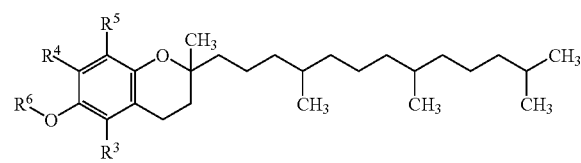

where R$^3$ is hydrogen or methyl, R$^4$ is hydrogen or methyl, R$^5$ is hydrogen or methyl and R$^4$ is hydrogen or an acid radical of 1 to 20 carbon atoms.

Preferred R$^6$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where R$^3$=R$^4$=R$^5$=methyl, especially racemic alpha-tocopherol. R$^6$ is more preferably hydrogen or acetyl. RRR-alpha-Tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content.

Crosslinkers b) are compounds having at least two polymerizable groups which can be free-radically interpolymerized into the polymer network. Useful crosslinkers b) include for example ethylene glycol dimethacrylate, diethylene glycol diacrylate, allyl methacrylate, trimethylolpropane triacrylate, triallylamine, tetraallyloxyethane as described in EP 530 438 A1, di- and triacrylates as described in EP 547 847 A1, EP 559 476 A1, EP 632 068 A1, WO 93/21 237 A1, WO 03/104 299 A1, WO 03/104 300 A1, WO 03/104 301 A1 and DE 103 31 450 A1, mixed acrylates which, as well as acrylate groups, comprise further ethylenically unsaturated groups, as described in DE 103 31 456 A1 and WO 04/013 064 A2, or crosslinker mixtures as described for example in DE 195 43 368 A1, DE 196 46 484 A1, WO 90/15 830 A1 and WO 02/032 962 A2.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth) acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP 343 427 A2. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention may utilize di(meth)acrylates of polyethylene glycols, the polyethylene glycol used having a molecular weight between 300 and 1000.

However, particularly advantageous crosslinkers b) are di- and triacrylates of 3- to 15-tuply ethoxylated glycerol, of 3- to 15-tuply ethoxylated trimethylolpropane, of 3- to 15-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of 40-tuply ethoxylated glycerol, of 40-tuply ethoxylated trimethylolethane and also of 40-tuply ethoxylated trimethylolpropane.

Very particularly preferred crosslinkers b) are diacrylated, dimethacrylated, triacrylated or trimethacrylated multiply ethoxylated and/or propoxylated glycerols as described for example in WO 03/104 301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual contents (typically below 10 weight ppm) in the water-absorbing polymer and the aqueous extracts of the water-absorbing polymers produced therewith have an almost unchanged surface tension (typically at least 0.068 N/m) compared with water at the same temperature.

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols, polymers formally constructed wholly or partly of vinylamine monomers, such as partially or completely hydrolyzed polyvinylamide (so-called "polyvinylamine") or polyacrylic acids, preferably polyvinyl alcohol and starch.

The polymerization is selectively carried out in the presence of customary polymerization regulators. Suitable polymerization regulators are for example thio compounds, such as thioglycolic acid, mercapto alcohols, for example 2-mercaptoethanol, mercaptopropanol and mercaptobutanol, dodecyl mercaptan, formic acid, ammonia and amines, for example ethanolamine, diethanolamine, triethanolamine, triethylamine, morpholine and piperidine.

The monomers (a), (b) and if appropriate (c) are selectively (co)polymerized with each other in the presence of the water-soluble polymers d) and in the presence of the polyetherols (e), in 20% to 80%, preferably 20% to 50% and especially 30% to 45% by weight aqueous solution in the presence of polymerization initiators. Useful polymerization initiators include all compounds that disintegrate into free radicals under the polymerization conditions, examples being peroxides, hydroperoxides, hydrogen peroxide, persulfates, azo compounds and the so-called redox initiators. The use of water-soluble initiators is preferred. It is advantageous in some cases to use mixtures of various polymerization initiators, examples being mixtures of hydrogen peroxide and sodium or potassium peroxodisulfate. Mixtures of hydrogen peroxide and sodium peroxodisulfate can be used in any desired ratio. Suitable organic peroxides are for example acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, tert-butyl per-3,5,5-trimethylhexanoate and tert-amyl perneodecanoate. Further suitable polymerization initiators are azo initiators, for example 2,2'-azobis(2-amidinopropane) dihydrochloride, 2,2'-azobis(N,N-dimethylene)-isobutyramidine dihydrochloride, 2-(carbamoylazo)isobutyronitrile and 4,4'-azobis(4-cyanovaleric acid). The polymerization initiators mentioned are used in customary amounts, for example in amounts of from 0.01 to 5 mol %, preferably 0.1 to 2 mol %, based on the monomers to be polymerized.

The redox initiators comprise, as oxidizing component, at least one of the above-indicated per compounds and a reducing component, for example ascorbic acid, glucose, sorbose, ammonium bisulfite, ammonium sulfite, ammonium thiosulfate, ammonium hyposulfite, ammonium pyrosulfite, ammonium sulfide, alkali metal bisulfite, alkali metal sulfite, alkali metal thiosulfate, alkali metal hyposulfite, alkali metal pyrosulfite, alkali metal sulfide (especially the sodium compounds), metal salts, such as iron(II) ions or silver ions or sodium hydroxymethylsulfoxylate, or a mixture of the disodium salts of 2-hydroxy-2-sulfinatoacetic acid and of 2-hydroxy-2-sulfonatoacetic acid, or else mixtures of said reducing components. The reducing component of the redox initiator used is preferably ascorbic acid or sodium pyrosulfite. $1 \cdot 10^{-5}$ to 1 mol % of the reducing component of the redox initiator and $1 \cdot 10^{-5}$ to 5 mol % of the oxidizing component are used based on the amount of monomers used in the polymerization. Instead of the oxidizing component or in addition it is also possible to use one or more water-soluble azo initiators.

A redox initiator consisting of hydrogen peroxide, sodium peroxodisulfate and ascorbic acid is preferably used. These components are used for example in the concentrations of $1 \cdot 10^{-2}$ mol % of hydrogen peroxide, 0.084 mol % of sodium peroxodisulfate and $2.5 \cdot 10^{-3}$ mol % of ascorbic acid, based on the monomers.

It is similarly possible to initiate the polymerization in some other way; many methods are known. One example is to initiate the polymerization by irradiation with ultraviolet light, usually in the presence of compounds which form free radicals on irradiation with ultraviolet light. Examples of such compounds are 2-hydroxy-2-methyl-1-phenyl-1-propanone and/or alpha,alpha-dimethoxy-alpha-phenylacetophenone.

The aqueous monomer solution may comprise the initiator in dissolved or dispersed form. However, the initiators may also be added to the polymerization reactor separately from the monomer solution.

The preferred polymerization inhibitors require dissolved oxygen for optimum effect. Therefore, the polymerization inhibitors can be freed of dissolved oxygen prior to polymerization, by inertization, i.e., by flowing an inert gas, preferably nitrogen, through them. This is accomplished by means of inert gas, which can be introduced cocurrently, countercurrently or at entry angles in between. Good commixing can be achieved for example with nozzles, static or dynamic mixers or bubble columns. The oxygen content of the monomer solution is preferably lowered to less than 1 weight ppm and more preferably to less than 0.5 weight ppm prior to polymerization. The monomer solution is selectively passed through the reactor using an inert gas stream.

Superabsorbents are typically obtained by addition polymerization of an aqueous monomer solution and selectively a subsequent comminution of the hydrogel. Suitable methods of making are described in the literature. Superabsorbents are obtained for example by gel polymerization in the batch process or tubular reactor and subsequent comminution in meat grinder, extruder or kneader, as described for example in EP 445 619 A2 and DE 19 846 413 A1;

addition polymerization in kneader with continuous comminution by contrarotatory stirring shafts for example, as described for example in WO 01/38 402 A1;

addition polymerization on belt and subsequent comminution in meat grinder, extruder or kneader, as described for example in EP 955 086 A2, DE 38 25 366 A1 or U.S. Pat. No. 6,241,928;

emulsion polymerization, which produces bead polymers having a relatively narrow gel size distribution, as described for example in EP 457 660 A1;

in situ addition polymerization of a woven fabric layer which, usually in a continuous operation, has previously been sprayed with aqueous monomer solution and subsequently been subjected to a photopolymerization, as described for example in WO 02/94 328 A2, WO 02/94 329 A1.

The cited references are expressly incorporated herein for details of process operation. The reaction is preferably carried out in a kneader or on a belt reactor.

In a particularly preferred form, the process of the present invention is carried out as a nonstatic or "stirred" polymerization, i.e., by input of mechanical energy, in particular shearing energy, into the mass to be polymerized. It is accordingly particularly preferred to conduct the process of the present invention with concurrent polymerization and comminution of the polymerization product. It is very particularly preferred to conduct the process of the present invention in a kneader. A kneader is equipped for example with one, two or else more stirring shafts, preferably one or two, more preferably two (usually disposed as a stirring shaft and a cleaning shaft or as two Sigma shafts), which co- or contrarotate and continuously comminute the material which is introduced into the kneader as a monomer solution and polymerizes in the kneader. Processes of this kind and apparatuses suitable therefor are described for example in WO 01/38 402 A1, WO 2006/034 806 A1 or WO 2006/34 853 A1, which are all hereby expressly incorporated herein by reference.

Continuous gel polymerization is the economically preferred and therefore currently customary way of manufacturing superabsorbents. The process of continuous gel polymerization is carried out by first producing a monomer mixture by admixing the acrylic acid solution with the neutralizing agent, optional comonomers and/or further auxiliary materials such as the polyetherols to be used in accordance with the invention at different times and/or locations and then transferring the mixture into the reactor or preparing the mixture as an initial charge in the reactor. The initiator system is added last to start the polymerization. The ensuing continuous process of polymerization involves a reaction to form a polymeric gel, i.e., a polymer swollen in the polymerization solvent—typically water—to form a gel, and the polymeric gel is already comminuted in the course of a stirred polymerization. The polymeric gel is subsequently dried, if necessary, and also chipped, ground and sieved and is transferred for further surface treatment.

The acid groups of the superabsorbents are typically partially neutralized, generally to an extent of at least 10 mol %, preferably to an extent of at least 25 mol % and more preferably at least 30 mol % and generally to an extent of not more than 95 mol %, preferably not more than 80 mol %, and more preferably not more than 50 mol %, for which the customary neutralizing agents can be used, preferably alkali metal hydroxides, alkali metal oxides, alkali metal carbonates or alkali metal bicarbonates and also mixtures thereof. Instead of alkali metal salts it is also possible to use ammonium salts. Sodium and potassium are particularly preferred as alkali metals, but most preference is given to sodium hydroxide, sodium carbonate or sodium bicarbonate and also mixtures thereof. Neutralization is customarily achieved by admixing the neutralizing agent as an aqueous solution or else preferably as a solid material. For example, sodium hydroxide having a water content of distinctly below 50% by weight can be present as a waxy mass having a melting point of above 23° C. In this case, metering as pieces or melt at elevated temperature is possible.

Neutralization can also be carried out after polymerization, at the hydrogel stage (i.e., before drying). But it is also possible to carry out the neutralization to the desired degree of neutralization wholly or partly prior to polymerization. In the case of partial neutralization prior to polymerization, generally at least 10 mol %, preferably at least 15 mol % and also generally not more than 40 mol %, preferably not more than 30 mol % and more preferably not more than 25 mol % of the acid groups in the monomers used are neutralized prior to polymerization by adding a portion of the neutralizing agent to the monomer solution. The desired final degree of neutralization is in this case only set toward the end or after the polymerization, preferably at the level of the hydrogel prior to its drying. The monomer solution is neutralized by admixing the neutralizing agent. The hydrogel can be mechanically comminuted in the course of the neutralization, for example by means of a meat grinder or comparable apparatus for comminuting gellike masses, in which case the neutralizing agent can be sprayed, sprinkled or poured on and then carefully mixed in. To this end, the gel mass obtained can be repeatedly meat-grindered for homogenization.

Neutralization of the monomer solution to the desired final degree of neutralization prior to polymerization by addition of the neutralizing agent is preferred.

The as-polymerized gels are selectively maintained for some time, for example for at least 30 minutes, preferably at least 60 minutes and more preferably at least 90 minutes and also generally not more than 12 hours, preferably for not more than 8 hours and more preferably for not more than 6 hours at a temperature of generally at least 50° C. and preferably at least 70° C. and also generally not more than 130° C. and preferably not more than 100° C., which further improves their properties in many cases.

It is similarly possible to employ further known measures for aftertreating the gel. For example, fines from sieving or screening steps of the continued manufacturing operation can be admixed at the stage of the polymerized gel before it has been dried. It is similarly possible to perform measures to lower the residual monomer content in the gel, for example by addition of further initiators. Selectively, the gel can also be treated with reducing agents (with sodium hydrogensulfite for example) or with bleaching agents.

The neutralized hydrogel is then dried with a belt or drum dryer until the residual moisture content is preferably below 15% by weight and especially below 10% by weight, the water content being determined by EDANA (European Disposables and Nonwovens Association) recommended test method No. 430.2-02 "Moisture content". The dry superabsorbent consequently contains up to 15% by weight of moisture and preferably not more than 10% by weight. The decisive criterion for classification as "dry" is in particular a sufficient flowability for handling as a powder, for example for pneumatic conveying, pack filling, sieving or other processing steps involved in solids processing technology. Selectively, however, drying can also be carried out using a fluidized bed dryer or a heated plowshare mixer. To obtain particularly colorless products, it is advantageous to dry this gel by ensuring rapid removal of the evaporating water. To this end, dryer temperature must be optimized, air feed and removal has to be policed, and at all times sufficient venting has to be ensured. Drying is naturally all the more simple—and the product all the more colorless—when the solids content of the gel is as high as possible. The solvent fraction at addition polymerization is therefore set such that the solids content of the gel prior to drying is therefore generally at least 20% by weight, preferably at least 25% by weight and more preferably at least 30% by weight and also generally not more than 90% by weight, preferably not more than 85% by weight and more preferably not more than 80% by weight. It is particularly advantageous to vent the dryer with nitrogen or some other nonoxidizing inert gas. Selectively, however, simply just the partial pressure of oxygen can be lowered during drying to prevent oxidative yellowing processes. But in general adequate venting and removal of the water vapor will likewise still lead to an acceptable product. A very short drying time is generally advantageous with regard to color and product quality.

The dried hydrogel (which is no longer a gel (even though often still called that) but a dry polymer having superabsorbing properties, which comes within the term "superabsorbent") is preferably ground and sieved, useful grinding apparatus typically including roll mills, pin mills, hammer mills, cutting mills or swing mills. The particle size of the sieved, dry hydrogel is preferably below 1000 μm, more preferably below 900 μm and most preferably below 850 μm and preferably above 80 μm, more preferably above 90 μm and most preferably above 100 μm.

Very particular preference is given to a particle size (sieve cut) in the range from 106 to 850 μm. Particle size is determined according to EDANA (European Disposables and Nonwovens Association) recommended test method No. 420.2-02 "Particle size distribution".

The dry superabsorbing polymers thus produced are typically known as "base polymers" and are then preferably surface postcrosslinked. Surface postcrosslinking can be accomplished in a conventional manner using dried, ground and classified polymeric particles. For surface postcrosslinking, compounds capable of reacting with the functional groups of the base polymer by crosslinking are applied, usually in the form of a solution, to the surface of the base polymer particles. Suitable postcrosslinking agents are for example:

- di- or polyepoxides, for example di- or polyglycidyl compounds such as phosphonic acid diglycidyl ester, ethylene glycol diglycidyl ether or bischlorohydrin ethers of polyalkylene glycols,
- alkoxysilyl compounds,
- polyaziridines, compounds comprising aziridine units and based on polyethers or substituted hydrocarbons, for example bis-N-aziridinomethane,
- polyamines or polyamidoamines and also their reaction products with epichlorohydrin,
- polyols such as ethylene glycol, 1,2-propanediol, 1,4-butanediol, glycerol, methyltriglycol, polyethylene glycols having an average molecular weight Mw of 200-10 000, di- and polyglycerol, pentaerythritol, sorbitol, the ethoxylates of these polyols and also their esters with carboxylic acids or carbonic acid such as ethylene carbonate or propylene carbonate,
- carbonic acid derivatives such as urea, thiourea, guanidine, dicyandiamide, 2-oxazolidinone and its derivatives, bisoxazoline, polyoxazolines, di- and polyisocyanates,
- di- and poly-N-methylol compounds such as for example methylenebis(N-methylolmethacrylamide) or melamine-formaldehyde resins,
- compounds having two or more blocked isocyanate groups such as for example trimethylhexamethylene diisocyanate blocked with 2,2,3,6-tetramethylpiperidin-4-one.

If necessary, acidic catalysts can be added, examples being p-toluenesulfonic acid, phosphoric acid, boric acid or ammonium dihydrogenphosphate.

Particularly suitable postcrosslinking agents are di- or polyglycidyl compounds such as ethylene glycol diglycidyl ether, the reaction products of polyamidoamines with epichlorohydrin, 2-oxazolidinone and N-hydroxyethyl-2-oxazolidinone.

Surface postcrosslinking (often just "postcrosslinking") is typically carried out by spraying a solution of the surface postcrosslinker (often just "postcrosslinker") onto the hydrogel or the dry base polymer powder.

The solvent used for the surface postcrosslinker is a customary suitable solvent, examples being water, alcohols, DMF, DMSO and also mixtures thereof. Particular preference is given to water and water-alcohol mixtures, example being water-methanol, water-1,2-propanediol and water-1,3-propanediol.

The spraying with a solution of the postcrosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful and known mixers include for example Lödige®, Bepex®, Nauta®, Processall® and Schugi® mixers. Very particular preference is given to high speed mixers, for example of the Schugi-Flexomix® or Turbolizer® type.

The spraying with the crosslinker solution can be selectively followed by a thermal treatment step, essentially to effect the surface-postcrosslinking reaction (yet usually just referred to as "drying"), preferably in a downstream heated mixer ("dryer") at a temperature of generally at least 50° C., preferably at least 80° C. and more preferably at least 90° C. and also generally not more than 250° C., preferably not more than 200° C. and more preferably not more than 150° C. The average residence time (i.e., the averaged residence time of the individual particles of superabsorbent) in the dryer of the superabsorbent to be treated is generally at least 1 minute, preferably at least 3 minutes and more preferably at least 5 minutes and also generally not more than 6 hours, preferably 2 hours and more preferably not more than 1 hour. As well as the actual drying taking place, not only any products of scissioning present but also solvent fractions are removed. Thermal drying is carried out in customary dryers such as tray dryers, rotary tube ovens or heatable screws, preferably in contact dryers. Preference is given to the use of dryers in which the product is agitated, i.e., heated mixers, more preferably shovel dryers and most preferably disk dryers. Bepex® dryers and Nara® dryers are suitable dryers for example. Fluidized bed dryers can also be used. But drying can also take place in the mixer itself, by heating the jacket or blowing a preheated gas such as air into it. But it is also possible for example to utilize an azeotropic distillation as a drying process. The crosslinking reaction can take place not only before but also during drying.

A particularly preferred embodiment of the present invention additionally comprises modifying the hydrophilicity of the particle surface of the base polymers through formation of complexes. Complexes are formed on the outer shell of the particles by spraying with solutions of bi- or more highly valent cations, the cations being capable of reacting with the acid groups of the polymer to form complexes. Examples of bi- or more highly valent cations are polymers formally constructed wholly or partly of vinylamine monomers, such as partially or completely hydrolyzed polyvinylamide (so-called "polyvinylamine") whose amine groups are always— even at very high pH values—partly present in a state of protonation to ammonium groups, or metal cations such as $Mg^{2+}$, $Ca^{2+}$, $Al^{3+}$, $Sc^{3+}$, $Ti^{4+}$, $Mn^{2+}$, $Fe^{2+/3+}$, $Co^{2+}$, $Ni^{2+}$, $Cu^{2+}$, $Zn^{2+}$, $Y^{3+}$, $Zr^{4+}$, $La^{3+}$, $Ce^{4+}$, $Hf^{4+}$, and $Au^{3+}$. Preferred metal cations are $Mg^{2+}$, $Ca^{2+}$, $Al^{3+}$, $Ti^{4+}$, $Zr^{4+}$ and $La^{3+}$, and particularly preferred metal cations are $Al^{3+}$, $Ti^{4+}$ and $Zr^{4+}$. The metal cations can be used not only alone but also in admixture with each other. Of the metal cations mentioned, any metal salt can be used that has sufficient solubility in the solvent to be used. Metal salts with weakly complexing anions such as for example chloride, nitrate and sulfate, hydrogensulfate, carbonate, hydrogencarbonate, nitrate, phosphate, hydrogenphosphate, dihydrogenphosphate and carboxylate, such as acetate and lactate, are particularly suitable. It is particularly preferred to use aluminum sulfate. Useful solvents for the metal salts include water, alcohols, DMF, DMSO and also mixtures thereof. Particular preference is given to water and water-alcohol mixtures such as for example water-methanol, water-isopropanol, water-1,2-propanediol and water-1,3-propanediol.

The treatment of the base polymer with solution of a bi- or more highly valent cation is carried out in the same way as that with surface postcrosslinker, including the selective drying step. Surface postcrosslinker and polyvalent cation can be sprayed onto the base polymer in a conjoint solution or as separate solutions. The spraying of the metal salt solution onto the particles of superabsorbent can take place not only before but also after the surface-postcrosslinking operation. In a particularly preferred process, the spraying with the metal salt solution takes place in the same step as the spraying with the crosslinker solution, the two solutions being dispensed separately in succession or simultaneously through two nozzles, or crosslinker solution and metal salt solution can be conjointly sprayed through one nozzle.

When a drying step is carried out after surface postcrosslinking and/or treatment with complexing agent, it is advantageous but not absolutely necessary to cool the product after drying. Cooling can be carried out continuously or discontinuously, conveniently by conveying the product continuously into a cooler downstream of the dryer. Any apparatus known for removing heat from pulverulent solids can be used, in particular any apparatus mentioned above as a drying apparatus, provided it is supplied not with a heating medium but with a cooling medium such as for example with cooling water, so that heat is not introduced into the superabsorbent via the walls and, depending on the design, also via the stirrer elements or other heat-exchanging surfaces, but removed from the superabsorbent. Preference is given to the use of coolers in which the product is agitated, i.e., cooled mixers, for example shovel coolers, disk coolers or paddle coolers, for example Nara® or Bepex® coolers. The superabsorbent can also be cooled in a fluidized bed by blowing a cooled gas such as cold air into it. The cooling conditions are set such that a superabsorbent having the temperature desired for further processing is obtained. Typically, the average residence time in the cooler will be in general at least 1 minute, preferably at least 3 minutes and more preferably at least 5 minutes and also in general not more than 6 hours, preferably not more than 2 hours and more preferably not more than 1 hour, and cooling performance will be determined such that the product obtained has a temperature of generally at least 0° C., preferably at least 10° C. and more preferably at least 20° C. and also generally not more than 100° C., preferably not more than 80° C. and more preferably not more than 60° C.

Optionally, a further modification of the superabsorbent can be effected by admixing finely divided inorganic solids, for example silica, alumina, titania and iron(II) oxide, which further enhances the effects of the surface aftertreatment. It is particularly preferred to admix hydrophilic silica or an alumina having an average primary particle size in the range from 4 to 50 nm and a specific surface area of 50-450 m$^2$/g. Finely divided inorganic solids are preferably admixed after the surface modification through crosslinking/complexing, but can also be carried out before or during these surface modifications.

Selectively, superabsorbent is provided with further customary additives and auxiliary materials to influence storage or handling properties. Examples thereof are colorations, opaque additions to improve the visibility of swollen gel, which is desirable in some applications, additions to improve the flowability of the powder, surfactants or the like. The superabsorbent is often admixed with dustproofing or dustbinding agents. Dustproofing or dustbinding agents are known in that for example polyether glycols such as polyethylene glycol having a molecular weight in the range from 400 to 20 000 g/mol, polyols such as glycerol, sorbitol, neopentylglycol or trimethylolpropane, which are selectively 7- to 20-tuply ethoxylated, are used. Similarly, a final water content can be set for the superabsorbent, if desired, by adding water.

The solids, additives and auxiliary materials can each be added in separate processing steps, but usually the most convenient method is to add them to the superabsorbent in the cooler, for example by spraying the superabsorbent with a solution or adding them in finely divided solid or in liquid form.

The surface-postcrosslinked superabsorbent is selectively ground and/or sieved in a conventional manner. Grinding is typically not necessary, but the sieving out of agglomerates which are formed or undersize is usually advisable to set the desired particle size distribution for the product. Agglomerates and undersize are either discarded or preferably returned into the process in a conventional manner and at a suitable point; agglomerates after comminution. The superabsorbent particle size is preferably not more than 1000 μm, more preferably not more than 900 μm, most preferably not more than 850 μm, and preferably at least 80 μm, more preferably at least 90 μm and most preferably at least 100 μm. Typical sieve cuts are for example 106 to 850 μm or 150 to 850 μm.

The present invention further provides articles for absorbing fluid which comprise the superabsorbent of the present invention. The present invention provides in particular hygiene articles, which are such articles for absorbing fluid as are intended for use in mild or severe incontinence, such as pads for severe or mild incontinence, incontinence, briefs, also diapers, training pants for babies and infants or else feminine hygiene articles such as liners, sanitary napkins or tampons, shoe inserts and other hygiene articles to absorb bodily fluids. Hygiene articles of this kind are known. The superabsorbent of the present invention can also be used in other technical and industrial fields where liquids, in particular water or aqueous solutions, are absorbed. These fields are for example storage, packaging, transportation (as constituents of packaging material for water- or moisture-sensitive articles, for example for flower transportation, also as protection against mechanical impacts); animal hygiene (in cat litter); food packaging (transportation of fish, fresh meat; absorption of water, blood in fresh fish or meat packs); medicine (wound plasters, water-absorbing material for burn dressings or for other weeping wounds), cosmetics (carrier material for pharmachemicals and medicaments, rheumatic plasters, ultrasonic gel, cooling gel, cosmetic thickeners, sun protection); thickeners for oil-in-water and water-in-oil emulsions; textiles (moisture regulation in textiles, shoe inserts, for evaporative cooling, for example in protective clothing, gloves, headbands); chemical engineering applications (as a catalyst for organic reactions, to immobilize large functional molecules such as enzymes, as adhesion agent in relation to agglomerations, heat storage media, filter aids, hydrophilic component in polymeric laminates, dispersants, superplasticizers); as auxiliaries in powder injection molding, in building construction and engineering (installation, in loam-based renders, as a vibration-inhibiting medium, auxiliaries in tunnel excavations in water-rich ground, cable sheathing); water treatment, waste treatment, water removal (deicing agents, reusable sandbags); cleaning; agritech (irrigation, retention of melt water and dew deposits, composting additive, protection of forests against fungal/insect infestation, delayed release of active components to plants); for firefighting or for fire protection; coextrusion agents in thermoplastic polymers (for example to hydrophilcize multilayered films); production of films and thermoplastic moldings able to absorb water (for example rain and dew water storage films for agriculture; superabsorbent-containing films for keeping fruit and vegetables fresh which are packed in moist films; superabsorbent-polystyrene coextrudates, for example for food packaging such as meat, fish, poultry, fruit and vegetables); or as carrier substance in formulations of active components (pharma, crop protection).

The present invention's articles for absorbing fluid differ from existing ones in comprising the superabsorbent of the present invention.

The present invention also provides a process for producing articles for absorbing fluid, in particular hygiene articles, which comprises producing the article in question by utilizing at least one superabsorbent of the present invention. In other respects, processes for producing such articles using superabsorbent are known.

The process of the present invention is more particularly elucidated by the examples which follow.

EXAMPLES

Test Methods
Centrifuge retention capacity (CRC):
Centrifuge retention capacity (CRC) is determined by EDANA (European Disposables and Nonwovens Association, Avenue Eugène Plasky 157, 1030 Brussels, Belgium) recommended test method No. 441.2-02 "Centrifuge Retention Capacity", which is available from EDANA at the address given.
Extractables
Extractables after 16 hours (E16) were determined as described in EP-A-0 811 636 page 13 lines 1 to 19.

Example 1

Preparation of a Polyetherol

A 20 l steel reactor equipped with shell cooling, ethylene oxide feed and internal thermometer was charged with 264 g of 3-allyloxy-1,2-propanediol and 4.05 g of potassium hydroxide. The reactor was purged with nitrogen, heated up to 100° C. internal temperature) and dewatered at 20 mbar. Then, a total of 1760 g of ethylene oxide were added over 605 minutes at 135° C. in such a way that the pressure was maintained at 9 bar. The reaction mixture was stirred to constant pressure, then cooled down to 80° C. and stripped with nitrogen to leave 1620.5 g of product.

Example 2

Preparation of a Polyetherol

A 20 l steel reactor equipped with shell cooling, ethylene oxide feed and internal thermometer was charged with 244.2 g of 3-allyloxy-1,2-propanediol and 3.7 g of potassium hydroxide. The reactor was purged with nitrogen and heated up to 100° C. (internal temperature). Then, a total of 1603.4 g of ethylene oxide were added over 495 minutes in such a way that the pressure is maintained between 5 and 8 bar. The reaction mixture was maintained at 8 bar and 100° C. for a further 6 hours and then cooled down to 80° C. and stripped with nitrogen to leave 1660.8 g of product.

The superabsorbents produced in the further examples were each produced according to the following general prescription:

3100.23 g of 37.3% aqueous sodium acrylate solution, 1328.61 g of acrylic acid and the particular hereinbelow indicated amount of completely ion-free water are mixed and sparged with nitrogen. This mixture is filled into a nitrogen-inertized kneader (manufacturer: Coperion Werner & Pfleiderer GmbH & Co. KG, Stuttgart, Germany; model LUK 8.0 K2 with two Sigma shafts). In succession there are added PEGDA 400 (diacrylic ester of a polyethylene glycol of average molecular weight 400) in the particular hereinbelow indicated amount, 3.32 g of urea, 22.14 g of 0.5% by weight aqueous ascorbic acid solution, 13.73 g of 15% by weight aqueous sodium persulfate solution and 2.21 g of 3% by weight aqueous hydrogen peroxide solution and also the particular hereinbelow indicated amount of an unsaturated polyetherol. The kneader contents are stirred at maximum speed (corresponding to about 98 rpm for the faster shaft and about 49 rpm for the slower shaft, ratio about 2:1). Immediately on addition of hydrogen peroxide, the heating jacket of the kneader is heated to 74° C. On reaching the maximum temperature, heating is discontinued and the kneader contents are allowed to react supplementarily for a further 15 min. The gel produced is cooled down to 65° C. and removed.

The gel is dried at 175° C. for 75 minutes in a circulating air drying cabinet loaded with 700 g of gel per drying tray. After threefold grinding in a roll stand (manufacturer: Bauermeister Zerkleinerungstechnik GmbH, Norderstedt, Germany, model LRC 125/70, with gap widths of 1000 μm, 600 μm, 400 μm), the polymer is passed through sieves to recover the sieve cut between 850 and 100 μm.

Example 3

Comparative Example

Amounts used:

2521.02 g of water
8.72 g of PEGDA 400

No unsaturated polyetherol was added.
The gel comprised some gel clumps 1 to 2 cm in size. The dried and sieved superabsorbent had a CRC of 25.6 g/g and also an E16 value of 8.5% by weight.

Example 4

Amounts used:

2519.38 g of water
6.86 g of PEGDA 400
1.0 g of unsaturated polyetherol of Example 1

The gel comprised virtually no gel clumps. The dried and sieved superabsorbent had a CRC of 25.3 g/g and also an E16 value of 8.9% by weight.

Example 5

Amounts used:

| | |
|---|---|
| 2520.24 | g of water |
| 5.00 | g of PEGDA 400 |
| 1.99 | g of unsaturated polyetherol of Example 1 |

The gel comprised virtually no gel clumps. The dried and sieved superabsorbent had a CRC of 27.0 g/g and also an E16 value of 10.9% by weight.

Example 6

Amounts used:

| | |
|---|---|
| 2528.61 | g of water |
| 6.86 | g of PEGDA 400 |
| 1.11 | g of unsaturated polyetherol of Example 2 |

The gel comprised virtually no gel clumps. The dried and sieved superabsorbent had a CRC of 25.4 g/g and also an E16 value of 8.3% by weight.

Example 7

Amounts used:

| | |
|---|---|
| 2519.82 | g of water |
| 6.86 | g of PEGDA 400 |
| 0.55 | g of unsaturated polyetherol of Example 2 |

The gel comprised virtually no gel clumps. The dried and sieved superabsorbent had a CRC of 26.9 g/g.

Example 8

Amounts used:

| | |
|---|---|
| 2519.77 | g of water |
| 6.86 | g of PEGDA 400 |
| 0.60 | g of Pluriol ® A10R ethoxylated allyl alcohol from BASF Aktiengesellschaft, Ludwigshafen, Germany |

The gel comprised virtually no gel clumps. The dried and sieved superabsorbent had a CRC of 25.3 g/g.

The examples show that the present invention's addition of an unsaturated polyetherol prevents clumping without significantly affecting other essential properties of the superabsorbent.

The invention claimed is:

1. A process for producing a superabsorbent, which comprises polymerizing at least one monomer in the presence of at least one crosslinker and at least one unsaturated polyetherol selected from the group consisting of polyetherols having a structural formula (1), (2), (3), and (4):

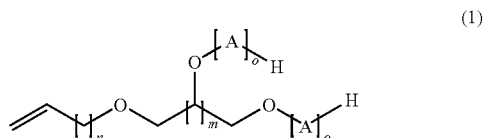

(1)

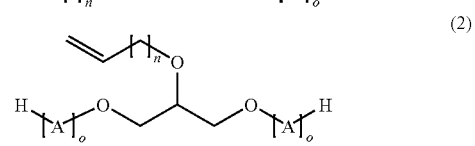

(2)

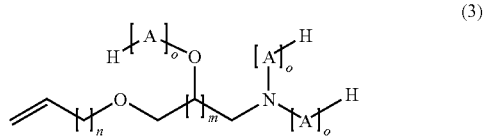

(3)

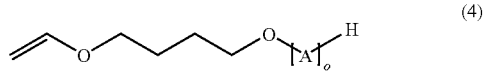

(4)

where n is 0 or 1,
m is 1, 2, 3, 4, 5 or 6,
o is a natural number from 1 to 200, and
A is —($H_2C$—$CHR^1$—O)— or —($R^1HC$—$CH_2$—O)—,
where $R^1$ in each occurrence is independently hydrogen or an organic radical.

2. The process according to claim 1 wherein the polyetherol has m equal 1.

3. The process according to claim 1 wherein the polyetherol has o being a natural number from 1 to 50.

4. The process according to claim 3 wherein the polyetherol has o being a natural number from 10 to 30.

5. The process according to claim 1 wherein the polyetherol has $R^1$ being hydrogen, methyl, or ethyl.

6. The process according to claim 5 wherein the polyetherol has $R^1$ being H.

7. The process according to claim 1 wherein the polymerizing is effected with an input of mechanical energy.

8. The process according to claim 7 wherein the polymerizing is effected in a kneader.

9. A superabsorbent prepared by the process of claim 1.

10. An article for absorbing fluids, comprising a superabsorbent prepared by the process of claim 1.

11. The process of claim 1 wherein the monomer comprises an ethylenically unsaturated carboxylic acid neutralized to an extent of at least 25 mol %.

* * * * *